(12) United States Patent
Cole

(10) Patent No.: US 10,316,505 B2
(45) Date of Patent: Jun. 11, 2019

(54) STORMWATER SIPHON CUBE

(71) Applicant: Thomas M Cole, Montecito, CA (US)

(72) Inventor: Thomas M Cole, Montecito, CA (US)

( * ) Notice: Subject to any disclaimer, the term of this patent is extended or adjusted under 35 U.S.C. 154(b) by 0 days.

(21) Appl. No.: 15/631,549

(22) Filed: Jun. 23, 2017

(65) Prior Publication Data

US 2018/0371738 A1    Dec. 27, 2018

(51) Int. Cl.
| | | |
|---|---|---|
| *E03F 3/04* | (2006.01) |
| *E02B 3/02* | (2006.01) |
| *E02B 5/08* | (2006.01) |
| *E03F 5/04* | (2006.01) |
| *E03F 5/06* | (2006.01) |
| *E03F 5/10* | (2006.01) |
| *E03F 5/12* | (2006.01) |
| *E02B 8/04* | (2006.01) |

(52) U.S. Cl.
CPC .............. *E03F 5/04* (2013.01); *E02B 3/02* (2013.01); *E02B 5/08* (2013.01); *E02B 8/04* (2013.01); *E03F 3/046* (2013.01); *E03F 5/0411* (2013.01); *E03F 5/06* (2013.01); *E03F 5/105* (2013.01); *E03F 5/12* (2013.01); *Y10T 137/402* (2015.04); *Y10T 137/87812* (2015.04); *Y10T 137/87877* (2015.04)

(58) Field of Classification Search
CPC ..... E03F 3/00; E03F 3/02; E03F 3/046; E03F 5/00; E03F 5/04; E03F 5/0411; E03F 5/105; E03F 5/107; E03F 5/12; E02B 3/00; E02B 3/02; E02B 5/08; E02B 5/082; E02B 8/04; E02B 8/06; F16K 11/16; F16K 11/168; F16K 11/20; Y10T 137/402; Y10T 137/877; Y10T 137/87788; Y10T 137/87812; Y10T 137/87877; Y10T 137/88046
USPC .......... 210/162, 170.03, 170.1, 747.1, 747.2, 210/747.3, 747.5; 137/236.1, 614.19, 137/861, 872, 875, 883; 405/80, 87
See application file for complete search history.

(56) References Cited

U.S. PATENT DOCUMENTS

| | | | | |
|---|---|---|---|---|
| 2,114,653 A | * | 4/1938 | Danel .................... | E02B 5/087 137/875 |
| 3,693,796 A | * | 9/1972 | Michel ................... | E02B 8/023 210/170.1 |
| 4,081,374 A | * | 3/1978 | Forshee ................ | B01D 35/28 210/162 |
| 4,578,188 A | * | 3/1986 | Cousino .................. | E03F 5/12 210/170.03 |
| 5,516,232 A | * | 5/1996 | Filipski .................. | E03F 3/046 137/236.1 |

(Continued)

*Primary Examiner* — Christopher Upton
(74) *Attorney, Agent, or Firm* — Mark Rodgers

(57) ABSTRACT

To provide a portable device capable of capturing a flow of water from a stream, storm drain or runoff channel, on command and send that captured water into a pipe system, while allowing remote adjustment of the capture and flow rates out of the cube device, the stormwater syphon cube includes a rock grate to prevent stormwater borne objects from entering the device, and an exit valve adjustable via cable control, a side extraction valve adjustable via cable control to adjust the water flow into the extraction pipe, and extraction pipe attached to the cube to carry extracted water away to storage. The sealed exit pipe acts as a syphon drawing water out of the cube.

3 Claims, 4 Drawing Sheets

(56) References Cited

U.S. PATENT DOCUMENTS

| | | | | |
|---|---|---|---|---|
| 5,533,303 A * | 7/1996 | Harvey | ...................... | E03B 3/02 |
| | | | | 137/861 |
| 5,672,028 A * | 9/1997 | Mehta | ........................ | E03F 1/00 |
| | | | | 405/87 |
| 5,770,057 A * | 6/1998 | Filion | ........................ | E03F 5/12 |
| | | | | 210/162 |
| 5,902,477 A * | 5/1999 | Vena | .......................... | E03F 5/12 |
| | | | | 210/162 |

* cited by examiner

STORMWATER SIPHON CUBE

BACKGROUND OF THE INVENTION

Field of the Invention

The present invention relates to a multivalve, portable device capable extracting stormwater on command into a series of exit pipes, when installed in a water channel or river bed.

Description of Related Art

In the field of stormwater capturing devices, technology for extracting water from a swift moving and erratic water channel environment, diversion dams have been in common use for thousands of years solving this problem on a grand scale. Large scale diversion dams are typically massive concrete structures with massive gates that function to shunt water from a River either into a pipe or channel and then to a storage area or reservoir. These massive projects do not transfer to small scale diversion projects because small communities, and counties cannot legally build in smaller streams and because the random and violent nature of intense rain storms and flash floods which often clog and destroy diversion pipes. Diversion dams also harm wild life and fish in particular, closing off their natural habitats.

With todays environmental awareness and concerns, a new method is needed to safely and efficiently extract stormwater from smaller urban creeks, and even from larger urban storm drains and washes. A device without the use of pumps and electrical equipment placed inside the creek area is needed. The nearest solution is what has been done in some rural communities in the past, where a simple pipe is placed into the creek path and some water flows into this pipe and can be collected. However there is no way to control the flow into this pipe, or control the amount of water taken out, and the pipe clogs in a season or less, is destroyed by rocks and debris and can't be cleaned or maintained beyond installing a new pipe. A portable, remotely controllable and easily installed device that solves these problems has been unknown in the art.

SUMMARY OF THE INVENTION

In view of the foregoing, the present invention has for its primary objective to provide a portable, easily installed, maintained and controlled device that can collect and divert storm water from a creek, river or storm channel, remotely and on command.

In order to accomplish the foregoing object of the present invention, the present invention provides a storm water diverter device, hereinafter referred to as a cube or siphon cube, that is, a metal or plastic cube of varying length and with an entrance and an exit which includes a grate structure at its entrance to limit the entrance of rocks and course debris from entering the cube, and inside the cube, a valve exists along the inside of the cube where such valve operates to shut off or allow water from inside the cube to flow into a side port extraction pipe or pass through the cube unhindered. Although the diverter device is generically referred to as a cube, which is the product name for the device, it is understood that the shape may not be an exact cube in all embodiments. The extraction valve in the present invention consists of two plates connected by a hinge pin and anchored to the inside of the cube by an additional hinge pin. Thus the extraction valve, when not acted upon by an extraction valve cable, hangs by gravity in a downward position blocking water flow from entering the side port extraction pipe located at the side of the cube. When the extraction valve cable is retracted from a slot cut in the top of the cube, that cable pulls the extraction valves upward towards the roof of the cube and the two valve plates fold together against the roof of the cube and thus allow water to leave the cube and enter the side port extraction pipe.

Inside the cube, water flows through the entrance rock grate, through the cube to the exit valve which is located at the back end, or downhill side of the cube where water flow is controlled by the exit valve. This exit valve is controlled remotely via a cable which is attached to the back of the exit valve plate, and operates to close the exit valve against the flow of water through the cube, and thus shunting the water in the cube to instead flow out the side port extraction pipe at the side of the cube. This cable will extend to a station onshore or above the cube so that a technician will be able to manually adjust the cable and thus adjust the exit valve thereby adjusting the amount of water that is released or contained within the cube during operation. The exit valve is a square or rectangle plate with a hinge at one end that is connected to the bottom inside of the cube, near the last portion or back of the cube interior. When in an open position, the exit plate on its hinge, lays flat by gravity, on the inside floor of the cube thus allowing water that is flowing into the cube to flow out of the cube unhindered over the exit plate. When the cable attached to the exit plate is pulled, as in a station located above the cube and out of the river flow, has a winch device that can be turned with a hand crank or an electric motor to reel in the cable, this action will lift the back of the exit valve and close off the flow of water through the cube, thus causing water entering the cube to be shunted out the side extraction pipe.

It is noted that water entering the cube from streams and creeks can be filled with floating debris, rocks, gravel, sand and silt and these materials that are not filtered out by the rock grate will enter the cube. When the cube exit valve is open and the extraction valve is closed, such gravels will travel straight through the cube and will not enter the extraction pipe, thus not excessively impacting water extraction. When the reverse condition exists, when the exit valve is closed and the extraction valve is open, water flowing into the cube will be blocked from exiting the back of the cube and will instead flow out of the extraction pipe attached at the side of the cube. The extraction pipe is located several inches above the bottom of the cube and so when gravels and silt are drawn through the cube, those materials will have a tendency to continue flowing along the bottom of the cube and not enter the extraction pie and continue to be carried by water flow to the exit end of the cube where such materials will be carried up over the exit valve plate, and out of the cube, back into the river.

By adjusting the exit valve to a partially closed position, heavier gravels and silt will be carried out the exit of the cube and back into the river, while cleaner water inside the upper levels of the cube will still be shunted into the extraction pipe. Thus the cube invention is able to be adjusted in real time for varying water, silt and gravel content conditions, which will aid in capturing cleaner water with less silt and gravel entering the extraction pipe. Also noting this cable controlled interior valve feature allows for self cleaning of the cube itself, and will also allow an onshore technician to completely open the cube and thus clean out any possible clog conditions that are likely in severely turbulent natural streams and rivers.

In a preferred embodiment of the present invention the cube is composed of a ½" thick steel cube, sixteen by sixteen inches on a side and seven feet long, thus allowing sufficient linear area for an adequate flowing extraction valve and pipe and sufficient area for an exit valve and allowing sufficient area for turbulent water to align, settle and exit the cube via the extraction pipe. In such a configured size, the extraction pipe may be a twelve inch diameter steel pipe, or other such high tensile strength material that can be attached by welds or bolts or other such means to the cube side or bottom as may be needed. At the end of the extraction pipe, a separate 12" pipe will be connected to carry water down stream and at a divergent angle so as to carry the extracted water toward the banks of said river or water channel and so eventually, over several hundred feet, to extract water away and above from said river. It should be noted that as the river proceeds downstream, it looses elevation and that the extraction pipe, will follow a path that drops less in elevation than the river bed and thereby eventually the extraction pipe will be above the river level, and at that point shall be available to deposit water into a sump by gravity feed, where said water can be pumped to storage using standard electro mechanical water pumps. This gravity feed method within the entire length of the extraction pipe will create a huge syphon effect in the cube itself, whereas several thousand gallons of water flowing hundreds feet of feet in a sealed pipe with an elevation loss will create this effect. And thus water will be vacuumed from the cube at a rate much higher than would be achieved from the actual pressure from the flow of river water into the cube. Tests show this effect will make possible the extraction of water from the test size 16"–16"×7 feet cube to be in the 40+ gallons per second range. This output number for instance will create ten acre feet of stored water per 24 hour period and thus the Stormwater Syphon Cube will function to capture large amounts of water from periodic stream flows such as are common in short rural and urban streams with intense rain events.

The extraction pipe in this preferred embodiment is attached by welds or is bolted to the side of the cube at a sharp angle of around 12 degrees so as to allow water to leave in a direction nearly parallel to the cube and thus nearly parallel to the river or creek being harvested. This angle allows for a large intake area as the extraction pipe will contact the cube at an angle creating a long ellipse at the junction area of the cube and the extraction pipe. This long ellipse will create a large area by which water may exit the cube and enter the extraction pipe. Noting this large elliptical outlet will further allow the increased water flows created by the aforementioned syphon effect.

At the end of the extraction pipe which is approximately at the end of the cube itself, the extraction pipe in the present embodiment of the invention will have a 12 degree angle adjustment so as to make the extraction pipe end be parallel to the cube. Noting this will allow water to be extracted directly down stream from the cube.

A 16"–16" inch cube is a utilitarian size that is selected for several reasons and to demonstrate the function and utility of the present invention. In preferred embodiments of the present invention, any scaled size may function with some efficiently however factors such as weight, installation ease, size of stream beds and expected water flows are factors to consider. Steel comes in a standard size of up to 16" square cubes and so this size is used as a functional demonstration. Also many small and medium sized rural streams have stream flow heights in the 12" to 40" range and so this efficient size of 16"–16"×7' is used herein to demonstrate utility and function. The weight of a steel Cube in this size range with attendant valves can be over six hundred pounds, and so lager cubes will be exponentially more heavy. It is anticipated that a small crane will be needed to install the present size embodiment in a stream bed and that bolting the cube to a concrete pad will anchor the cube into place, to which the cube will be bolted into place and maintained during dry or low water times. Thus the cube will be anchored or bolted to a concrete pad so as to withstand the thousands of pounds of force encountered during river flows. It is anticipated that steel or some other metal will be needed to create a cube strong enough to survive river and flood driven boulder and gravel scouring conditions encountered each year. The cube could be made of plastic or a composite material. It is anticipated that the exit valves will need to be made of steel or some other tough metal or alloy to withstand conditions. It is anticipated the side port extraction valve assembly of plates and hinges may be steel plate and or plastic, composites or combinations there of. It is noted the side port extraction plate in one embodiment operates on a cable retraction to open and via gravity to close on loosening of said cable, and thus the plate system will need some weight to function, either a weighted plastic or lighter material or a singular or collection of metal plates that will operate to close the side port exit valve when released via the remote cable system.

In another preferred embodiment of the present invention the cube will have on its metal leading edges, a composite, plastic or other tough substance like graphite composites to protect to underlaying metal. It is anticipated the cube itself and all other metal surfaces will be further protected by a high strength marine type surface covering or other military grade marine surface coating to protect the device from corrosion, friction and wear. In another preferred embodiment of the present invention, the cube and attendant parts may be constructed from stainless steel, plastic, composite, graphite composite or other such high strength materials or combination thereof.

In another preferred embodiment of the present invention the extraction pipe can be attached at the bottom surface of the cube, thus allowing water to exit downward. In this version the cube may be installed onto a weir or other concrete structure in a water channel so that the cube back end will be hanging over the falls, and thus the extraction pipe will exit straight down, below the cube and the extracted water will flow downward and off to the side of the falls on a river or water channel.

In still a further preferred embodiment of the present invention, several cubes may be placed side by side or in a staggered side by side pattern. In this mode, water collected from multiple cubes separated several feet from each other, or connected directly, will flow in separate pipes from each cube, that connect into a single pipe, or a group of pipes for the long flow downstream and out to the sump area via gravity flow. This method of a plurality of cubes may be used when there is a wide channel and a shallow flow, as several cubes will gather more water than one.

In yet another preferred embodiment of the present invention the cube size and shape varies with stream and flow conditions, and so we could have a cube that is 16" high and 24" wide and the valves would be made to fit any new sized version. Such a "wide stance" model would collect differing amounts of water and would conceivably collect water in a slower moving stream more efficiently than a 16"–16" model. Yet all the other features may remain basically the same. There is no reason a cube could not be five feet square or larger, with care taken to create strong enough materials, cables, valves, pipes and plates to withstand expected hydraulic forces of a five foot or higher stream flowing a 20 plus knots.

In yet another embodiment of the present invention the cube is instead a cylindrical shape or other geometric shape and the valves are accordingly ellipse or circular shaped and the rest of the design parameters are the same. These secondary shaped cubes will not function as well as the previously described square or rectangular cubes and some may not work at all, but are mentioned herein to ward off cheap imitators.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

BRIEF DESCRIPTION OF THE DRAWINGS

In any event, the present invention will become more clearly understood from the following description of preferred embodiments thereof, when taken in conjunction with the accompanying draftings. The embodiments and drawings are given only for the purpose of illustration and explanation, and are not to be taken as limiting the scope of the present invention in any way, which scope is to be determined by the appended claims.

Is a top view diagram showing the stormwater syphon cube or cube and its attendant parts in a preferred embodiment.

FIG. 2

Is a longitudinal view of the cube showing the internal parts via shaded panels and doted lines to indicate internal parts in a preferred embodiment.

FIG. 3

Is a head on view of the cube showing internal valves and side port extraction pipe in a preferred embodiment.

FIG. 4

Is a longitudinal view showing a preferred embodiment of cube installation and function.

DESCRIPTION OF PREFERRED EMBODIMENTS

Hereinafter, some preferred embodiments of the present invention will be described in detail with particular reference to the accompanying drawings.

Figure 1:
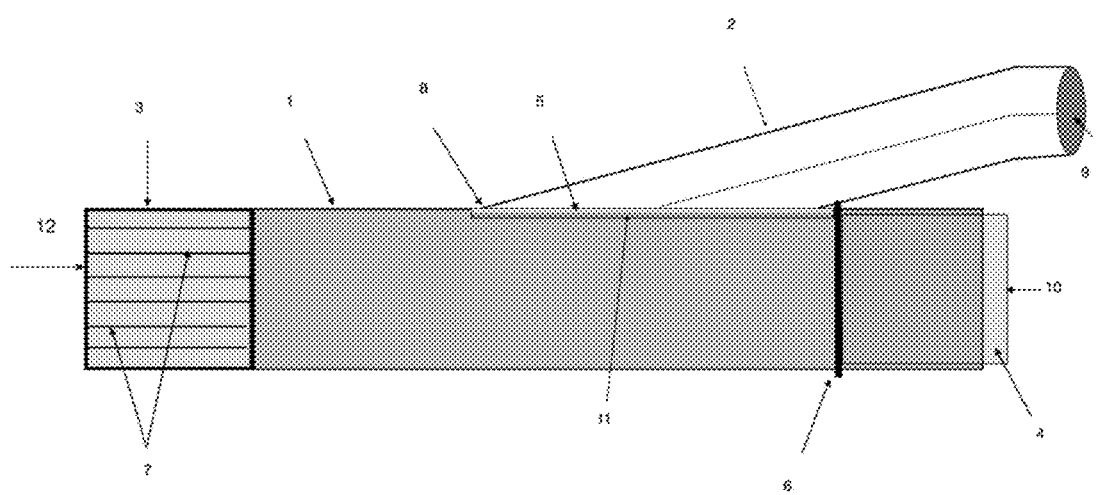
FIG. 1

FIG. 1 shows the cube 1 and the water inlet 12 of the cube structure where a rock grill front 3 and rock grill vanes 7 filters larger rocks and debris from water entering the cube 1. The rock grill front 3 may in one embodiment be constructed with an angled lift as shown and with a pointed center to shunt rocks, logs and other debris off to one side or another as well as lifting debris. This shaped rock grill front 3 will aid in preventing rocks or debris from lifted straight up and striking or interfering with the plurality of control cables 10, 11 which are exiting the cubes 1 top surface. After water enters the cube 1 it can flow straight through and leave the cube if the exit plate valve 4 and cable attach—exit valve cable plate 10 is in the down position. If the exit plate valve 4 is in the up position due to being raised via the cable attach-exit valve cable plate 10, then water is shunted into the extraction pipe exit 2 and leaves via the extraction pipe exit 9. The side port extraction pipe 2 is connected by welds or bolts to the cube 1 and through out the entire pipe at location 8. Water can be excluded from the side port extraction pipe 2 by lowering the side port extraction valve 5 which is accomplished via retracting the cable attach-extraction plate cable 11. Thus by closing off the exit valve plate 4 and opening the side port extraction valve 5 stormwater will be syphoned off into the side port extraction pipe 2 and exit via the extraction pipe exit 9 and into a constructed pipe system to harvest this water. The exit valve plate 4 pivots within the cube 1 on the exit plate axel pin 6.

Figure 2:
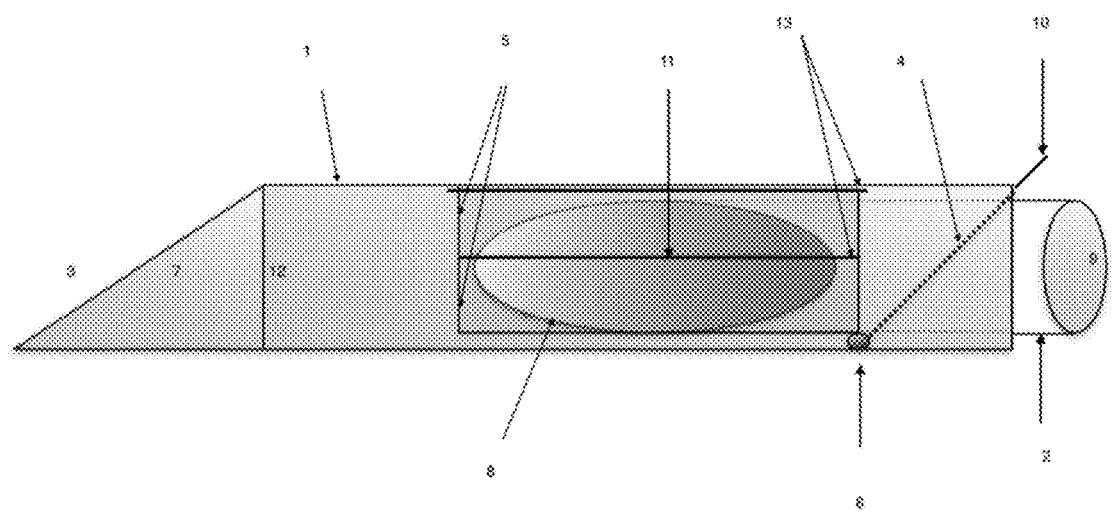

FIG. 2 shows a side view of cube 1 starting with the rock grill front 3, the extraction pipe 2, the exit valve axel pin 6 and in an x-ray view of the extraction pipe weld to cube 8. Further views show how the extraction valve plates 5 are attached to the roof of the cube 1 and held in place by extraction valve hinge pins 13 and are lifted or lowered via side port valve extraction valve 5. When water is not wanted for capture in the extraction pipe 2 the extraction valve plates 5 will be closed/lowered, and thus water will flow straight through the cube 1 and exit passed the exit valve plate 4. To collect water, the exit valve cable 10 is retracted which causes the exit valve plate 4 to pivot on the exit valve axel pin 6 and thus water is closed off from exiting and is shunted out the extraction pipe 2.

Figure 3:
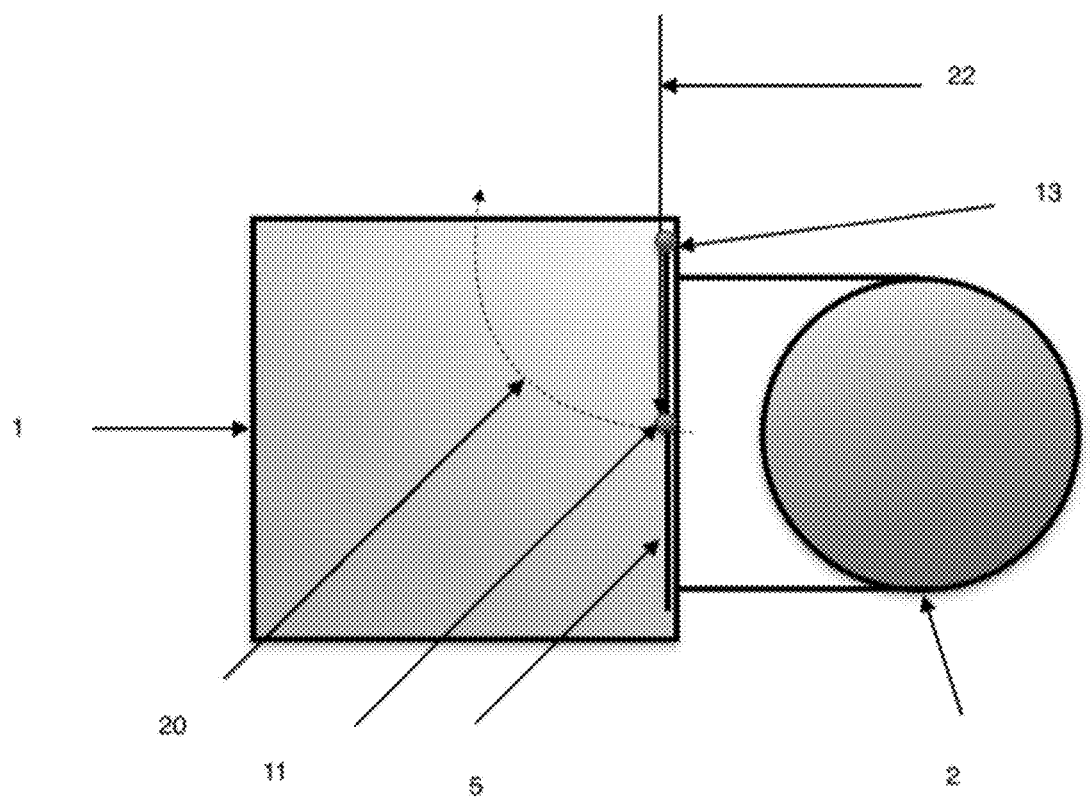

FIG. 3 shows a head on view from the back or exit of the cube 1 depicting the side port extraction valve plates 5 and the side port pull cable 10 where it connects to lift the valve plates 5. The side port extraction valve plates 5 will hang via gravity against the side of the cube interior 1 when not acted upon by the side port pull cable 11 and thus those plates 5 will block water and debris from entering the extraction pipe 2. This feature means the cube water intake can be controlled from a remote site above a water course/river when it's impossible to otherwise access the cube, and so if water is not needed at a point in time, technicians can lower the side port extraction plates 5 and open the exit plate, (not shown in this diagram for ease of viewing). 20 shows the travel of the side port extraction valve plates 5 when acted upon by the side port pull cable 22. Extraction valve hinge pins 13 are shown between the side port extraction valve plates 5. There is a slot cut in the top of the cube 1 to accommodate the side port pull cable 22 when it is retracted.

Figure 4:
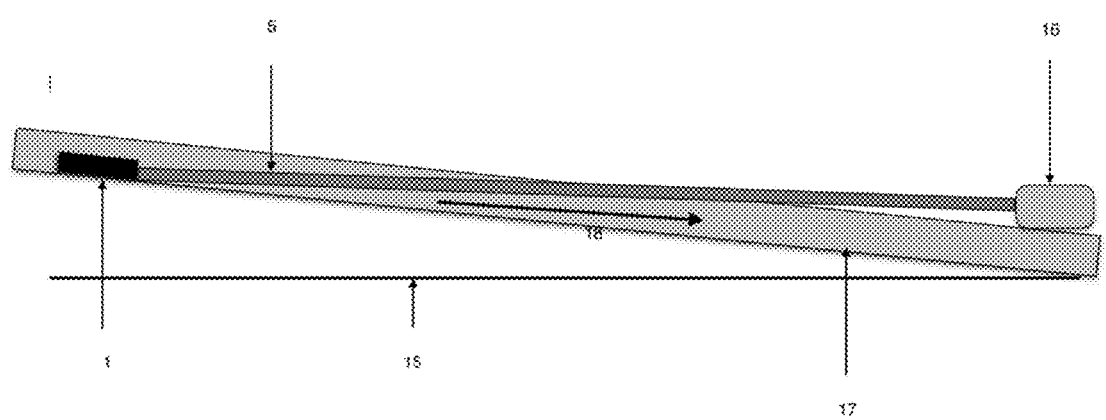

FIG. 4 shows a side view of a preferred embodiment installation of the cube 1 in a river bed 17 to show preferred functionality. The cube 1 sits in the bottom of a river bed 17 and collects water into the side port exit pipe 2 which is directed down stream at an angle less than that of the riverbed 17. Flat level is indicated by 15. Over distance the side port exit pipe 2 will eventually raise above the river bank 6 and thus captured water can be placed via gravity into a sump 16. The sump 16 is higher than the river bank 6 and so the sump 16 is not in the river, keeping expensive pumps and dangerous electrical out of harms way. Thus water is removed from a river via gravity, a unique and useful feature. This view also demonstrates how the syphon effect is created, due to the weight of several thousand gallons of water traveling downhill within the side port exit pipe 2. This water weight traveling downhill in a sealed pipe system will create a high degree of water draw or vacuum within the cube 1 itself and this effect adds substantially to the cubes 1 extraction rates. 18 indicates the direction of water flow.

What is claimed is:

1. A stormwater siphon cube, comprising;
   an elongated cube shaped diverter device (cube) configured for installation in at least one of river bed or water channel wherein stormwater flows into the entrance of said diverter device; comprising,
   a rock screening grate and with a series of internal valves configured to channel water at least one of straight through said cube and back to the stream or to divert water out through a side port extraction pipe which carries said water diagonally at a shallow angle and out of the water channel or river bed via gravity;
   a plurality of valves and plates within said cube comprising an exit valve located at the back end of said cube comprising of a plate with an axel attached to the interior of said cube;
   a retractable cable which configured to at least one of close the exit plate valve against the top edge of said cube by a cable pulling or releasing said exit valve plate to drop via gravity and water pressure and lay flat against the bottom of said cube thereby allowing water to pass through said cube unhindered;
   a second valve comprising a series of plates on hinges wherein one hinge is attached on the side and at the upper portion of said cube and configured to react to a cable retraction wherein said second valve plates are configured to lift and fold up against the top inside surface of said cube and thus allow water within said cube to leave via a side extraction pipe and when said cable is released said plates will unfold and drop via gravity to form a flat barrier hanging against the side wall of said cube and thereby act to close off water flow out of the side port extraction pipe.

2. The stormwater siphon cube as claimed in claim 1, further comprising:
   a detachable interchangeable rock grate configured to be removed and changed for maintenance and differing river conditions;
   a plurality of cables configured to manipulate a plurality of valves and plates within cube that control water flows through said cube from remote locations on shore.

3. The stormwater siphon cube as claimed in claim 1, further comprising:
   a plastic or composite protective material on the leading forward edges of said cube;
   and a protective corrosion resistant sealer applied over all surfaces and parts of said cub.

* * * * *